US012504900B1

(12) United States Patent
Saralaya et al.

(10) Patent No.: US 12,504,900 B1
(45) Date of Patent: Dec. 23, 2025

(54) MEMORY DATA RETENTION USING ISOLATION INTERFACE

(71) Applicant: Amazon Technologies, Inc., Seattle, WA (US)

(72) Inventors: Chakrapani Saralaya, Cedar Park, TX (US); Kristopher Ryan King, Austin, TX (US); Chen Zhu, Cedar Park, TX (US); Kishore Yalamanchili, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 17/809,380

(22) Filed: Jun. 28, 2022

(51) Int. Cl.
*G06F 3/06* (2006.01)

(52) U.S. Cl.
CPC .......... *G06F 3/0632* (2013.01); *G06F 3/0604* (2013.01); *G06F 3/0679* (2013.01)

(58) Field of Classification Search
CPC .............................. G06F 3/0632; G06F 3/0604
See application file for complete search history.

(56) References Cited

U.S. PATENT DOCUMENTS

| | | | | |
|---|---|---|---|---|
| 11,328,764 | B2* | 5/2022 | Shaeffer | G11C 11/4096 |
| 2001/0052056 | A1* | 12/2001 | Acton | G06F 15/17381 |
| | | | | 709/251 |
| 2008/0028187 | A1* | 1/2008 | Casselman | G06F 13/409 |
| | | | | 712/E9.005 |
| 2018/0336111 | A1* | 11/2018 | Gendler | G06F 1/3287 |
| 2019/0171536 | A1* | 6/2019 | Refaeli | G06F 11/1695 |
| 2019/0347125 | A1* | 11/2019 | Sankaran | G06F 9/30047 |
| 2023/0140769 | A1* | 5/2023 | Zhou | H04L 67/12 |
| | | | | 370/254 |
| 2023/0291406 | A1* | 9/2023 | Cochell | G06F 30/34 |
| | | | | 710/23 |

* cited by examiner

*Primary Examiner* — Nicholas A. Paperno
(74) *Attorney, Agent, or Firm* — Weaver Austin Villeneuve & Sampson LLP (57) ABSTRACT

A programmable integrated circuit (IC) device can include memory isolation logic to isolate a memory device to retain the data stored in the memory device during a partial reconfiguration of the IC device. The memory isolation logic can isolate the memory device after receiving an isolation request to retain the data in the memory device, and de-isolate the memory device after receiving a de-isolation request when the reconfiguration of the user programmable logic is completed. Isolating the memory device may include invalidating memory requests from user programmable logic in the IC device and de-isolating may include providing the user programmable logic access to the memory device.

21 Claims, 5 Drawing Sheets

MEMORY DATA RETENTION USING ISOLATION INTERFACE

BACKGROUND

A Field Programmable Gate Array (FPGA) device is a hardware device that can be reprogrammed to implement different logic functions. An FPGA device can be partitioned into multiple regions comprising custom logic blocks, standard logic blocks, memory interface blocks, and a system interface. Some cloud-computing environments can provide FPGA devices in the cloud that can be programmed by a user to implement or test out custom logic designed by the user.

BRIEF DESCRIPTION OF THE DRAWINGS

Various embodiments in accordance with the present disclosure will be described with reference to the drawings, in which.

DETAILED DESCRIPTION

A Field Programmable Gate Array (FPGA) device is a reprogrammable hardware device that can implement different logic functions. An example FPGA device can be partitioned into multiple regions comprising user programmable logic, memory interfaces, intellectual property (IP) blocks, and a system interface based on the system specification. The user programmable logic can be developed, simulated, debugged, and compiled by the user to generate a bitstream that can be used to configure the FPGA device using the system interface. In some examples, a user can utilize cloud-based FPGA development tools to develop custom logic and generate a bitstream that can be deployed on a cloud-based FPGA to configure or reconfigure the FPGA. For example, FPGAs can be used to deploy custom hardware accelerations for various applications such as data analytics, image and video processing, network security, and genomics.

Some computing environments can support partial reconfiguration of the FPGA devices. In some implementations, some of the regions of an FPGA device (e.g., system interface, memory interfaces) can be optimized for timing and area that can be treated as static regions and need not be reconfigured. In some examples, the user can revise the custom logic to fix bugs and/or modify the functionality of the custom logic, and regenerate the bitstream. The updated bitstream can be reloaded to the FPGA device to reconfigure the user programmable logic without reprogramming the static regions.

In some instances, it may be desirable to use the same dataset across multiple reloads of the bitstream to test a logic design (or any user specific logic) without having to load or transfer the dataset manually for each reload. For example, the dataset can be loaded in a double data rate (DDR) memory, when an FPGA device is initially configured. In some implementations, the user can request to retain the dataset in the DDR memory across various reloads by enabling a data retention feature using an application programming interface (API). When the data retention feature is enabled, the system software can copy the calibration data used by a DDR controller for interfacing with the DDR memory (e.g., timing synchronization parameters), and put the DDR memory in the self-refresh mode while reconfiguring the FPGA device with the updated bitstream. For example, the calibration data can be copied to the host memory of the host computer providing the FPGA device. Once the updated bitstream is loaded, the software can read the previously saved calibration data from the host memory, which can be used by the DDR controller to interface with the DDR memory, and bring the DDR memory out of the self-refresh mode. The user can now test or execute the updated custom logic using the same dataset.

However, saving the calibration data for the DDR memory to the host memory, and reloading the calibration data from the host memory may introduce timing delays and adversely impact the system performance, and, therefore, may not be the most optimal solution to retain the data stored in the memory devices across multiple reloads. Furthermore, the FPGA device may include different types of memories. For example, in addition to the DDR memory, the FPGA device may include an embedded memory such as a high bandwidth memory (HBM) to support higher bandwidth and performance for certain applications. As such, an improved data retention mechanism can be implemented to reduce the downtime when reconfiguring the FPGA device, and to achieve data retention on different types of memories during reconfiguration of the FPGA device.

The techniques described herein can be used to retain data stored in different types of memory devices for an FPGA by using a memory isolation interface corresponding to each memory device. Embodiments can use the memory isolation interface to isolate the corresponding memory device during the reconfiguration of the user programmable logic, and de-isolate the corresponding memory device upon completion of the reconfiguration of the user programmable logic. For example, isolating the memory device may include disabling access to the memory device by the user programmable logic, and de-isolating the memory device may include enabling the access to the memory interface logic and/or the memory device. Thus, isolating each memory device can allow that memory device to retain the stored memory data without the need to save the memory data temporarily elsewhere (e.g., host memory) prior to the reconfiguration and to reload the memory data after the completion of the reconfiguration, which can improve the system performance.

In some implementations, the FPGA design can be partitioned into different Partial Reconfiguration (PR) regions to allow reloading a user bitstream to certain PR regions without disrupting the logic in other PR regions. For example, an FPGA device may include a first set of PR regions allocated to the user programmable logic, a PR region for a host interface that communicates with the software layer, and a second set of PR regions allocated to different memory devices. In some implementations, the second set of PR regions may include, for each memory device, memory interface logic coupled to that memory device, and memory isolation logic coupled to the memory interface logic and the user programmable logic. The different memory devices may include DDR memory, HBM, static random-access memory (SRAM), block random-access memory (BRAM), ultra random-access memory (URAM), or other types of volatile memory and/or non-volatile memory.

In some implementations, the user may send a data retention request using an application programming interface (API) to retain data in the memory devices during the partial reconfiguration of the FPGA device. The host interface may receive the data retention request through the software layer and send an isolation request to the memory isolation logic for each memory device prior to reconfiguring the user programmable logic. The memory isolation logic may invalidate (e.g., ignore) any memory requests from the user programmable logic to the memory device and drive the outputs to the memory interface logic and/or memory device to a stable state based on the isolation request. Once the reconfiguration of the user programmable logic is complete, the host interface may send a de-isolation request to the memory isolation logic. The memory isolation logic can provide the user programmable logic with access to the memory device after receiving the de-isolation request.

Thus, certain embodiments can be used to retain data stored in different types of memory devices in the FPGA device, without needing to temporarily move the calibration data to the host memory, or transitioning the memory device to a self-refresh mode. Thus, some embodiments can be used to improve the system performance by avoiding the latency incurred due to storing and reloading the calibration data. Note that the embodiments can be used to provide data retention for any type of memory device using the memory isolation logic, without deviating from the scope of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
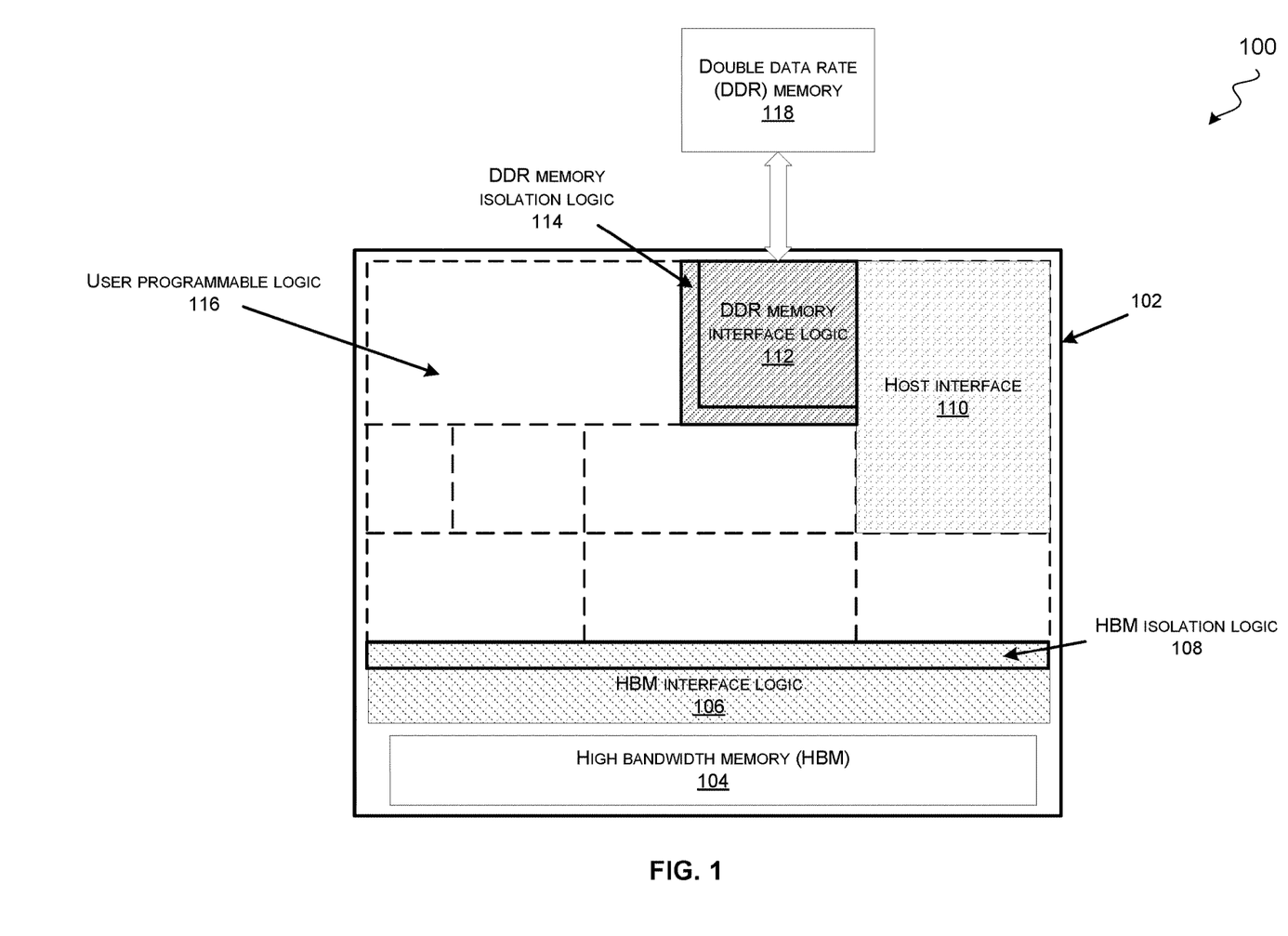
FIG. 1 illustrates an example floorplan for an FPGA device comprising memory isolation logic for data retention, according to some embodiments.

FIG. 1 illustrates an example floorplan 100 for an FPGA device 102 comprising memory isolation logic for data retention, according to some embodiments.

In some examples, the FPGA device 102 can be part of a compute instance in a cloud-based server to provide programmable hardware that can implement user logic function. In some examples, plurality of such FPGA devices 102 can be used in the compute instance to provide custom hardware acceleration for applications in deep learning and inference, image and video processing, network security, genomics, data analytics, or accelerated search, among others.

The FPGA device 102 may be partitioned into multiple regions, which can be partially reconfigured by reloading a bitstream only into certain regions of the FPGA device 102. For example, Xilinx® Dynamic Function eXchange (DFX) build flow can support reloading a bitstream to specific regions of an FPGA device without disrupting logic in the other regions. In some embodiments, the FPGA device 102 may be partitioned into multiple regions including a high bandwidth memory (HBM) 104, HBM interface logic 106, HBM isolation logic 108, a host interface 110, DDR memory interface logic 112, DDR memory isolation logic 114, and user programmable logic 116.

The HBM 104 may include an HBM Intellectual Property (IP) memory block, which may be coupled to the HBM interface logic 106. In various implementations, the HBM 104 may include multiple memory stacks and/or channels, and memory controllers based on the specification. The HBM interface logic 106 may include clocks and other suitable interfaces to perform read and write accesses with the HBM 104. The HBM interface logic 106 may be configured to communicate with the user programmable logic 116 through the HBM isolation logic 108 using a bus interface. For example, the bus interface may be based on an Advanced extensible Interface (AXI) bus protocol or another suitable bus protocol.

The DDR memory interface logic 112 may be coupled to a DDR memory 118. In some implementations, the DDR memory 118 may be a dual in-line memory module (DIMM). The DDR memory interface logic 112 may include DDR memory controller(s) to perform read and write accesses with the DDR memory 118, registers that are accessible by the host interface 110 to reset and/or calibrate the DDR memory 118, and any other suitable logic. The DDR memory interface logic 112 may communicate with the user programmable logic 116 through the DDR memory isolation logic 114 using a bus interface. For example, the bus interface can be based on the AXI bus protocol or another suitable bus protocol.

The host interface 110 may include logic for communicating with the system software (e.g., host software) to support the configuration or re-configuration of the FPGA device 102, enabling or disabling the memory data retention feature, and supporting other features based on the system specification. In some embodiments, the host interface 110 may include logic for implementing external peripherals, Peripheral Component Interconnect express (PCIe) interface, direct memory access (DMA) interface, interrupts, etc., to support the functionalities based on the system specification.

In some implementations, a user may utilize a hardware development kit (HDK) to design and develop custom logic for a specific application (e.g., hardware acceleration), and generate a binary image for the custom logic. The FPGA device 102 may include static regions that need not be reconfigured. The static regions may include all the regions in the FPGA device 102 except the user programmable logic regions 116, e.g., the host interface 110, HBM interface logic 106, HBM isolation logic 108, DDR memory interface logic 112, and the DDR memory isolation logic 114. In various implementations, the PR regions of the FPGA device 102 can be developed using a hardware description language (e.g., Verilog or VHDL), or using the Open Custom Logic (OpenCL) framework. The user can integrate the binary image for the custom logic with the binary image corresponding to the static regions, which can be used to generate bitstreams for loading into the FPGA device 102 to initially configure the FPGA device 102.

The user can use the configured FPGA device 102 to run tests and debug the design to verify the functionality of the custom logic, or to execute the custom logic. In some examples, the user can load the HBM 104 with a first dataset and the DDR memory 118 with a second dataset, which can be used for testing or executing the design. In some cases, the user may change the custom logic to fix bugs or modify the design features, and regenerate the binary image from the modified custom logic. The regenerated binary image can be reloaded into the user programmable logic 116 by partially reconfiguring the FPGA device 102 using the updated bitstream.

In some examples, the user may enable the data retention feature when requesting a reload of the user bitstream to reconfigure the user programmable logic 116 using an API. In some embodiments, the system software may set an isolation enable bit in a status register in the host interface 110 based on the data retention feature enabled by the user. For example, the status register may be written by the system software to enable or disable data retention in the HBM 104 and the DDR memory 118.

The host interface 110 may send an HBM isolation request to the HBM isolation logic 108 to isolate the HBM 104 during the partial reconfiguration of the FPGA device 102 based on the isolation enable bit being set in the status register. The host interface 110 may also send a DDR memory isolation request to the DDR memory isolation logic 114 to isolate the DDR memory 118 during the partial reconfiguration of the FPGA device 102 based on the isolation enable bit being set in the status register. In some implementations, each memory may have its own isolation enable bit, and the data retention can be applied independently to each memory. The host interface 110 may reconfigure the user programmable logic 116 according to the user bitstream. The host interface 110 may send an HBM de-isolation request to the HBM isolation logic 108 to de-isolate the HBM 104 based on the isolation enable bit being reset in the status register upon completion of the partial reconfiguration of the FPGA device 102. The host interface 110 may send a DDR memory de-isolation request to the DDR memory isolation logic 114 to de-isolate the DDR memory 118 based on the isolation enable bit being reset in the status register upon completion of the partial reconfiguration of the FPGA device 102.

The HBM isolation logic 108 may include circuitry to isolate the HBM 104 during the partial reconfiguration of the FPGA device 102 in response to the HBM isolation request to retain the first dataset by disabling access to the HBM interface logic 108, and to de-isolate the HBM 104 after completion of the partial reconfiguration of the FPGA device 102 in response to the HBM de-isolation request. For example, the HBM isolation request may be received when the HBM isolation signal is asserted by the host interface 110, and the HBM de-isolation request may be received when the HBM isolation signal is de-asserted by the host interface 110.

The HBM isolation logic 108 may be configured to monitor completion of outstanding transactions to access the HBM 104, and determine that the HBM 104 is ready to be isolated once all the pending transactions to the HBM 104 have been completed. In some embodiments, the HBM isolation logic 108 may determine that the HBM 104 is ready to be isolated upon expiration of a timer that is initiated when the HBM isolation request is received from the host interface 110. The timer may be configured by the system software with a pre-determined value based on the system specification. The HBM isolation logic 108 may isolate the HBM 104 by invalidating memory requests from the user programmable logic 116 and driving outputs to the HBM 104 to a known stable state (e.g., logic 0). The HBM isolation logic 108 may be further configured to enable the access to the HBM interface logic 106 by the user programmable logic 116 after waiting for a pre-determined number of cycles upon receiving the HBM de-isolation request.

The DDR memory isolation logic 114 may include circuitry to isolate the DDR memory 118 based on a DDR isolation request received from the host interface 110, and to de-isolate the DDR memory 118 based on a DDR de-isolation request received from the host interface 110. For example, the DDR isolation request may be received when the DDR isolation signal is asserted by the host interface 110, and the DDR de-isolation request may be received when the DDR isolation signal is de-asserted by the host interface 110.

The DDR memory isolation logic 114 may be configured to monitor completion of outstanding transactions to access the DDR memory 118, and determine that the DDR memory 118 is ready to be isolated once all the pending transactions to the DDR memory 118 have been completed. In some embodiments, the DDR memory isolation logic 114 may determine that the DDR memory 118 is ready to be isolated upon expiration of a timer that is initiated when the DDR isolation request is received from the host interface 110. The timer may be configurable, and can be programmed, for example, by the system software with a pre-determined value based on the system specification. The DDR memory isolation logic 114 may isolate the DDR memory 118 by invalidating memory requests from the user programmable logic 116 and driving outputs to the DDR memory 118 to a known stable state (e.g., logic 0). The DDR memory isolation logic 114 may be further configured to enable the access to the DDR memory interface logic 112 by the user programmable logic 116 after waiting for a pre-determined number of cycles upon receiving the DDR de-isolation request.

Figure 2:
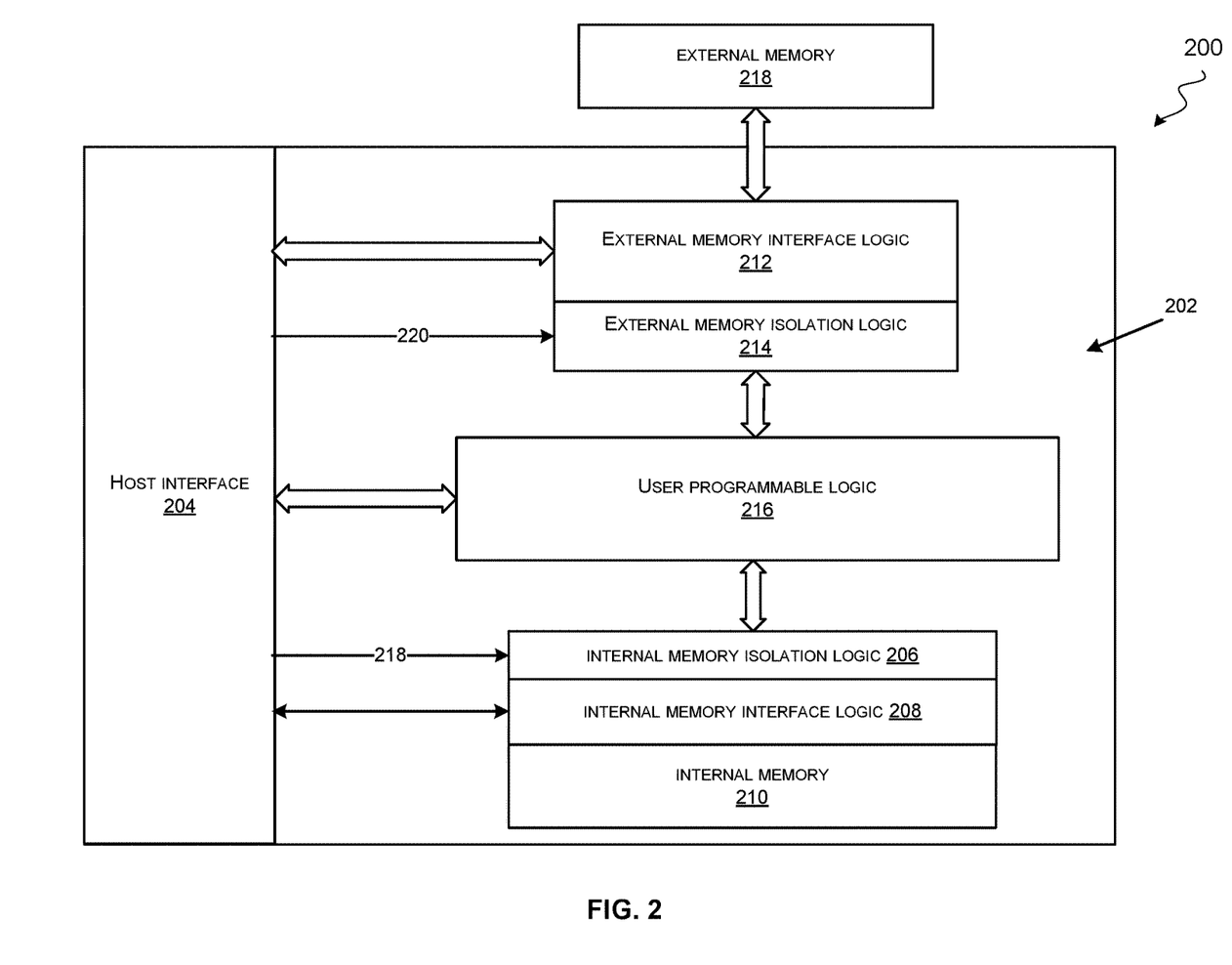
FIG. 2 illustrates an example block diagram for an integrated circuit device comprising memory isolation logic for data retention, according to some embodiments.

FIG. 2 illustrates an example block diagram 200 for an IC device 202 comprising memory isolation logic for data retention, according to some embodiments. The IC device 102 can be a programmable device, such as the FPGA device 102 in FIG. 1.

The IC device 202 may include a host interface 204 coupled to internal memory isolation logic 206, internal memory interface logic 208, an internal memory 210, external memory interface logic 212, external memory isolation logic 214, and user programmable logic 216. The external memory interface logic 212 may also be coupled to an external memory 218.

The internal memory 210 and/or the external memory 218 may include an HBM, a DRAM, an SDRAM, a DDR RAM, an SRAM, a BRAM, or an URAM, among other examples. In some embodiments, the HBM 104 can be an example of the internal memory 210 and the DDR memory 118 can be an example of the external memory 218.

The host interface 204 may include the functionality of the host interface 110. For example, the host interface 204 may be configured to receive a request for data retention in the internal memory 210 and the external memory 218 during partial reconfiguration of the IC device 202. The partial reconfiguration of the IC device 202 may include downloading a bitstream to the IC device 102 that reconfigures the user programmable logic 216 without reprogramming the host interface 204, the internal memory isolation logic 206, the internal memory interface logic 208, the external memory interface logic 212, and the external memory isolation logic 214. In some embodiments, the host interface 204 may be coupled to the user programmable logic 216 using a PCIe interface.

The internal memory isolation logic 206 may be configured to isolate the internal memory 210 to retain the data stored in the internal memory 210 by invalidating memory requests from the user programmable logic 216 during the reconfiguration of the user programmable logic 216. Similarly, the external memory isolation logic 214 may be configured to isolate the external memory 218 to retain the data stored in the external memory 218 by invalidating memory requests from the user programmable logic 216 during the reconfiguration of the user programmable logic 216.

The host interface 204 may assert an isolation signal 218 to send an internal memory isolation request to the internal memory isolation logic 206 and assert an isolation signal 220 to send an external memory isolation request to the external memory isolation logic 214 during the reconfiguration of the user programmable logic 216. The host interface 110 may de-assert the isolation signal 218 and the isolation signal 220 when the reconfiguration of the user programmable logic 216 is completed.

The internal memory isolation logic 206 may be further configured to provide the user programmable logic 216 with access to the internal memory 210 after receiving an internal memory de-isolation request when the isolation signal 218 is de-asserted. Similarly, the external memory isolation logic 214 may be further configured to provide the user programmable logic 216 with access to the external memory 218 after receiving an external memory de-isolation request when the isolation signal 220 is de-asserted.

Figure 3:
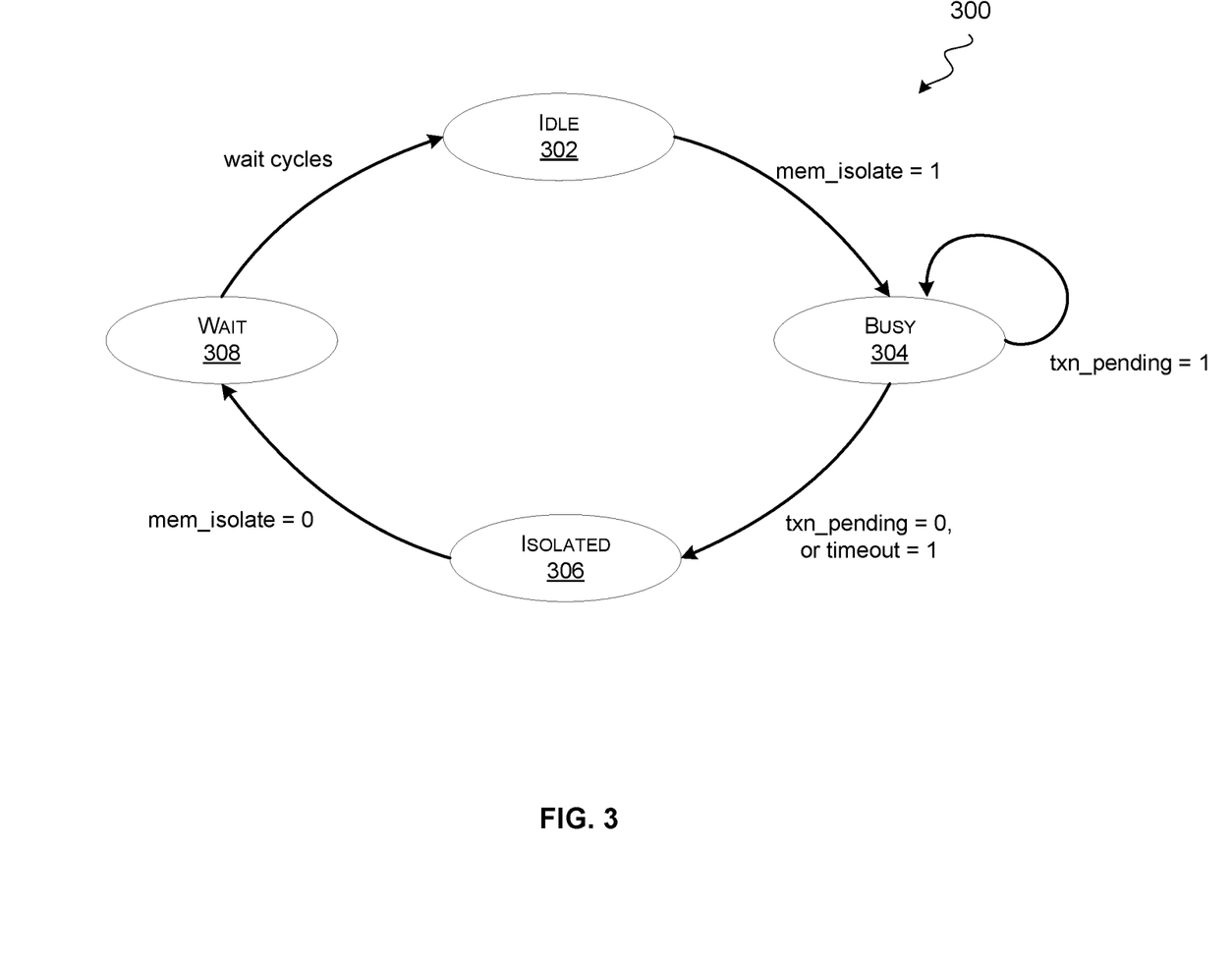
FIG. 3 illustrates an example of a state machine used by memory isolation logic to perform memory isolation for data retention, according to some embodiments.

FIG. 3 illustrates an example of a state machine 300 used by memory isolation logic to perform memory isolation for data retention, according to some embodiments. For example, the state machine 300 may be executed by the HBM isolation logic 108, the DDR memory isolation logic 114, internal memory isolation logic 206, and/or the external memory isolation logic 212.

Initially, the state machine 300 may be in an idle state 302. In this state, the memory regions may be active (e.g., not isolated) and accessible by the user programmable logic 216. The memory transactions may be queued in the respective memory controllers for the internal memory 210 and the external memory 218.

When the user programmable logic 216 is ready to be reconfigured, the host interface 204 may assert the memory isolation signals 218, 220 based on the memory isolation enable bit being set in the status register (e.g., mem_isolate=1). The state machine 300 may transition to a busy state 304 to check for any pending transactions. The internal memory isolation logic 206 and the external memory isolation logic 214 may keep track of any outstanding memory requests from the user programmable logic 216 and stop accepting any new memory requests when the state machine 300 is in the busy state 304 (e.g., txn_pending=1). The internal memory isolation logic 206 and the external memory isolation logic 214 may also start a respective timer upon receiving the memory isolation signals 218, 220, respectively, within which all the outstanding pending transactions are expected to be completed.

Once all the outstanding pending transactions are completed (e.g., txn_pending=0) or the timer has expired (e.g., timeout=1), the state machine 300 may transition to an isolated state 306. In the isolated state 306, the state machine 300 may assert a corresponding reset to the internal memory isolation logic 206 and the external memory isolation logic 214, thus, any input requests or glitches from the user programmable logic 216 may be ignored. The state machine 300 may also drive outputs from the internal memory isolation logic 206 to the internal memory 210, and from the external memory isolation logic 214 to the external memory 218 to a known stable state, e.g., logic 0. In some implementations, the outputs may include a corresponding memory ready signal, which may be held to a logic 0.

In some examples, if the timer is expired before the outstanding pending transactions are completed, an error signal may be sent to the host interface 204. The host interface 204 may generate an interrupt or notify the system software of the error using any other mechanism. Thus, some embodiments can be used to ensure the isolation of the memory regions irrespective of the completion of the outstanding pending transactions so that the FPGA device is ready to reload the new bitstream into the user programmable logic. In some implementations, the host interface 204 may continue to assert the memory isolation signal while the reconfiguration of the user programmable logic 216 is in progress.

Once the partial bitstream has been loaded into the user programmable logic 216, and the internal memory 210 and the external memory 218 are ready to be de-isolated, the host interface 204 may de-assert the memory isolation signals 218, 220 (e.g., mem_isolate=0) and cause the state machine 300 to transition to the wait state 308. The wait state 308 may allow the state machine 300 to wait for a few cycles (e.g., wait cycles) before transitioning to the idle state 302 where the memory regions can be active again. In various implementations, a timer or a counter can be used to implement the wait cycles.

Figure 4:
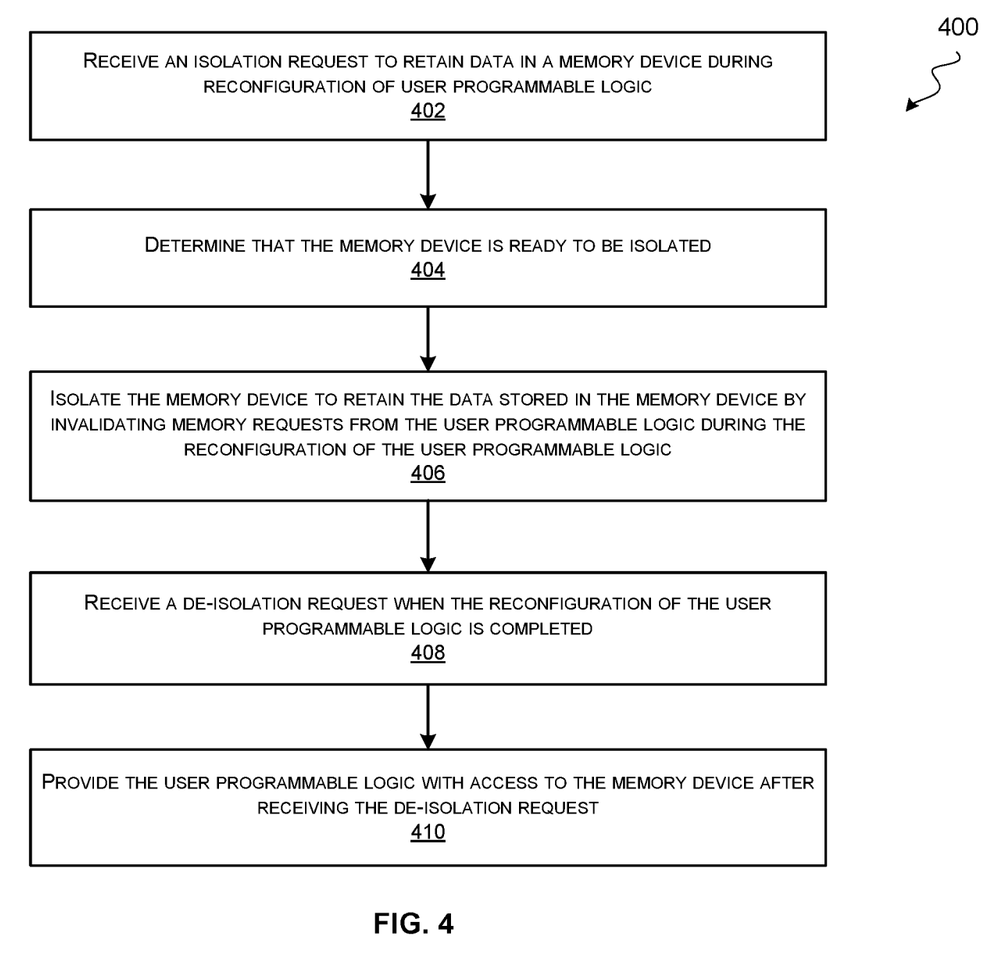
FIG. 4 illustrates a flow chart for an example method that can be executed by memory isolation logic in a programmable device to isolate a memory device during the partial reconfiguration of the programmable device, according to some embodiments.

FIG. 4 illustrates a flow chart 400 for an example method that can be executed by memory isolation logic in a programmable device to isolate a memory device during the partial reconfiguration of the programmable device, according to some embodiments. For example, the method can be executed by the HBM isolation logic 108 and the DDR memory isolation logic 114 in the FPGA device 102 to isolate the HBM 104 and the DDR memory 118, respectively, during the partial reconfiguration of the FPGA device 102.

In state 402, the method may include receiving an isolation request to retain data in a memory device during a reconfiguration of user programmable logic. The isolation request can be received, for example, from the host interface. For example, the state machine 300 for the HBM isolation logic 108 and the state machine 300 for the DDR memory isolation logic 114 may be in the idle state 302. The HBM isolation logic 108 may receive the HBM isolation signal from the host interface 110 when the user programmable logic 216 is ready to be reconfigured, which may transition the state machine 300 in the HBM isolation logic 108 to the busy state 304. Similarly, the DDR memory isolation logic 114 may receive the DDR memory isolation signal from the host interface 110 when the user programmable logic 216 is ready to be reconfigured, which may transition the state machine 300 in the DDR memory isolation logic 114 to the busy state 304.

In state 404, the method may include determining that the memory device is ready to be isolated. In the busy state 304, the state machine 300 in the HBM isolation logic 108 may determine that the HBM 104 is ready to be isolated upon expiration of a timer or once the outstanding transactions to access the HBM 104 are completed. Similarly, the state machine 300 in the DDR memory isolation logic 114 may determine that the DDR memory 118 is ready to be isolated upon expiration of a timer or once the outstanding transactions to access the DDR memory 118 are completed. When the HBM isolation logic 108 determines that the HBM 104 is ready to be isolated, the state machine 300 in the HBM isolation logic 108 may transition to the isolated state 306, and when the DDR memory isolation logic 114 determines that the DDR memory 118 is ready to be isolated, the state machine 300 in the DDR memory isolation logic 114 may transition to the isolated state 306.

In state 406, the method may include isolating the memory device to retain the data stored in the memory device by invalidating memory requests from the user programmable logic during the reconfiguration of the user programmable logic. In the isolated state 306, the HBM isolation logic 108 may isolate the HBM 104 to retain the data stored in the HBM 104 by invalidating memory requests from the user programmable logic 116 during the reconfiguration of the user programmable logic 116, and the DDR memory isolation logic 114 may isolate the DDR memory 118 to retain the data stored in the DDR memory 118 by invalidating memory requests from the user programmable logic 116 during the reconfiguration of the user programmable logic 116. In the isolated state 306, the HBM isolation logic 108 may also drive outputs to the HBM 104 to a known stable state (e.g., logic 0), and the DDR memory isolation logic 114 may also drive outputs to the DDR memory 118 to a known stable state (e.g., logic 0).

In state 408, the method may include receiving a de-isolation request when the reconfiguration of the user programmable logic is completed. The de-isolation request can be received, for example, from the host interface. Once the partial bitstream has been loaded into the user programmable logic 116, the HBM isolation logic 108 and the DDR memory isolation logic 114 may receive a respective de-isolation request from the host interface 110, and the state machine 300 in the HBM isolation logic 108 and the DDR memory isolation logic 114 may transition to the wait state 308.

In state 410, the method may include providing the user programmable logic with access to the memory device after receiving the de-isolation request. The wait state 308 may allow the state machine 300 to wait for a few cycles before transitioning to the idle state 302 where the HBM 104 and the DDR memory 118 are active again. Thus, the user programmable logic 116 can again access the HBM 104 and the DDR memory 118 after the HBM 104 and the DDR memory 118 have been de-isolated.

Thus, isolating a memory device using the memory isolation logic can eliminate the need to store the calibration data temporarily to the host memory during the partial reconfiguration of the FPGA device and restore the calibration data upon completion of the partial reconfiguration, which can improve the system performance since the data stays intact in the memory devices. Note that the techniques described herein can be used to retain data in any type of memory device, or isolate other types of IC devices without deviating from the scope of the disclosure.

Figure 5:
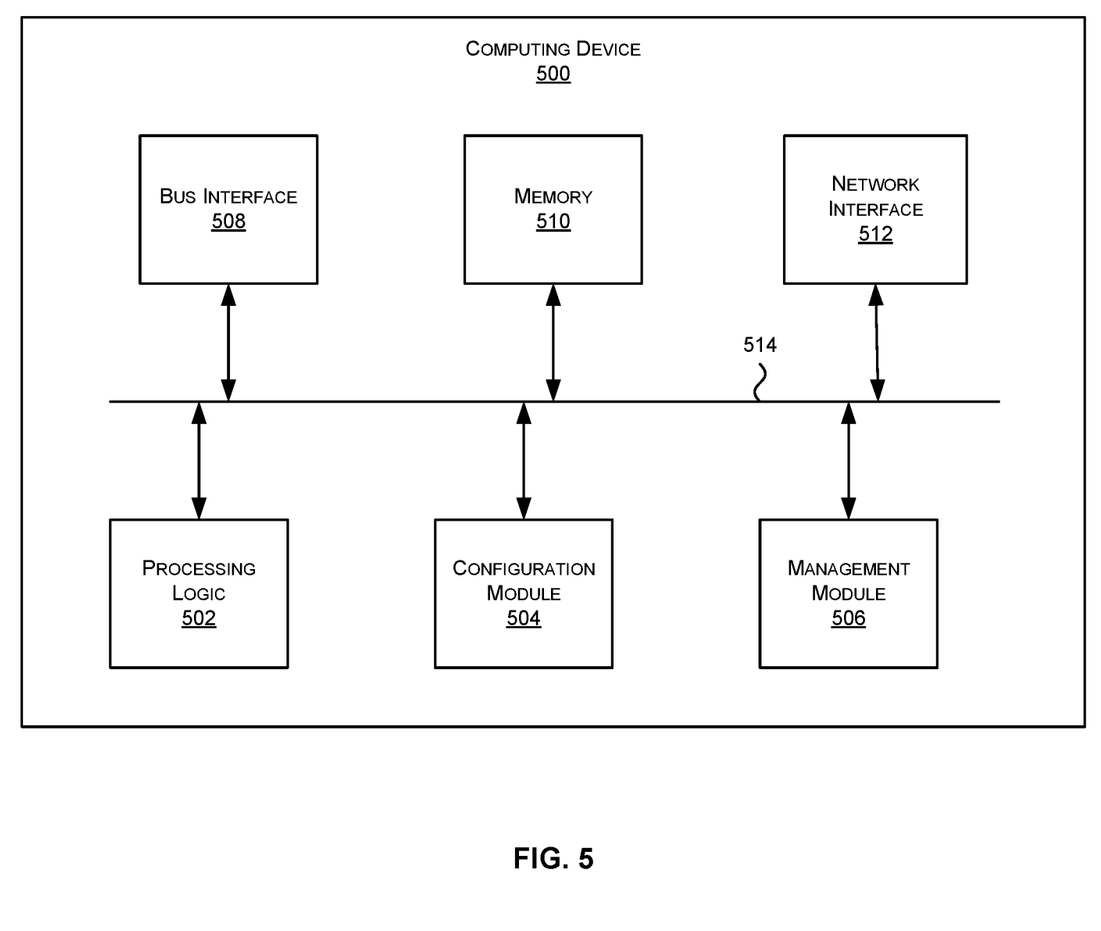
FIG. 5 illustrates an example of a computing device, according to certain aspects of the disclosure.

FIG. 5 illustrates an example of a computing device 500. Functionality and/or several components of the computing device 500 may be used without limitation with other embodiments disclosed elsewhere in this disclosure, without limitations. For example, the FPGA device 102 or the IC device 202 may include the functionality and/or components of the computing device 500. A computing device 500 may facilitate processing of packets and/or forwarding of packets from the computing device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 500 may be the recipient and/or generator of packets. In some implementations, the computing device 500 may modify the contents of the packet before forwarding the packet to another device. The computing device 500 may be a peripheral device coupled to another computer device, a switch, a router or any other suitable device enabled for receiving and forwarding packets.

In one example, the computing device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The computing device 500 may include additional modules, which are not illustrated here. In some implementations, the computing device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the computing device 500, while in other cases some or all of the memory may be external to the computing device 500. The memory 510 may store an operating system comprising executable instructions that, when executed by the processing logic 502, provides the execution environment for executing instructions providing networking functionality for the computing device 500. The memory may also store and maintain several data structures and routing tables for facilitating the functionality of the computing device 500.

In some implementations, the configuration module 504 may include one or more configuration registers. Configuration registers may control the operations of the computing device 500. In some implementations, one or more bits in the configuration register can represent certain capabilities of the computing device 500. Configuration registers may be programmed by instructions executing in the processing logic 502, and/or by an external entity, such as a host device, an operating system executing on a host device, and/or a remote device. The configuration module 504 may further include hardware and/or software that control the operations of the computing device 500.

In some implementations, the management module 506 may be configured to manage different components of the computing device 500. In some cases, the management module 506 may configure one or more bits in one or more configuration registers at power up, to enable or disable certain capabilities of the computing device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the computing device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 500 may include multiple network interface modules, each configured to communicate with a different network. For example, in these implementations, the computing device 500 may include a network interface module for communicating with a wired Ethernet network, a wireless 802.11 network, a cellular network, an Infiniband network, etc.

The various components and modules of the computing device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A field programmable gate array (FPGA) device, comprising:
   a user programmable logic region;
   memory interface logic coupled to a memory;
   isolation logic coupled to the memory interface logic; and
   a host interface coupled to the isolation logic, wherein the host interface is configured to:
      receive a data retention request to retain data in the memory during partial reconfiguration of the FPGA device in which the user programmable logic region is being reconfigured by a user bitstream;
      in response to the data retention request, send an isolation request to the isolation logic to isolate the memory during the partial reconfiguration of the FPGA device;
      reconfigure the user programmable logic region according to the user bitstream; and
      send a de-isolation request to the isolation logic to de-isolate the memory after completion of the partial reconfiguration of the FPGA device, and
   wherein the isolation logic is configured to:
      isolate the memory during the partial reconfiguration of the FPGA device in response to the isolation request to retain the data stored in the memory by disabling access to the memory interface logic; and
      de-isolate the memory after completion of the partial reconfiguration of the FPGA device in response to the de-isolation request to provide the user programmable logic region with access to the data retained in the memory.

2. The FPGA device of claim 1, wherein the isolation logic is configured to, prior to isolating the memory:
   monitor completion of outstanding transactions to access the memory; and
   determine that the memory is ready to be isolated upon expiration of a timer or once the outstanding transactions to access the memory are completed.

3. The FPGA device of claim 1, wherein de-isolating the memory includes enabling access to the memory interface logic by the user programmable logic region after waiting for a pre-determined number of cycles upon completion of the partial reconfiguration of the FPGA device.

4. The FPGA device of claim 1, wherein the memory is a high bandwidth memory (HBM) that is internal to the FPGA device, or a double data rate (DDR) memory that is external to the FPGA device.

5. An integrated circuit device comprising:
   a memory interface configured to perform read and write accesses with a memory device; and
   memory isolation logic communicatively coupled between the memory interface and user programmable logic, the memory isolation logic configured to:
      receive an isolation request to retain data in the memory device during a reconfiguration of the user programmable logic;
      determine that the memory device is ready to be isolated;
      isolate the memory device to retain the data stored in the memory device by invalidating memory requests from the user programmable logic during the reconfiguration of the user programmable logic;
      receive a de-isolation request when the reconfiguration of the user programmable logic is completed; and
      provide the user programmable logic with access to the data retained in the memory device after receiving the de-isolation request.

6. The integrated circuit device of claim 5, wherein the memory device is ready to be isolated upon completion of pending transactions to the memory device.

7. The integrated circuit device of claim 5, wherein the memory device is ready to be isolated upon expiration of a timer that is initiated when the isolation request is received.

8. The integrated circuit device of claim 5, wherein access to the memory device is provided to the user programmable logic after waiting for a pre-determined number of cycles following the de-isolation request.

9. The integrated circuit device of claim 5, wherein the isolation request is received when an isolation signal is asserted, and the de-isolation request is received when the isolation signal is de-asserted.

10. The integrated circuit device of claim 5, wherein isolating the memory device includes driving outputs from the memory isolation logic to the memory device to a known stable state.

11. The integrated circuit device of claim 5, wherein the memory device is one of a plurality of memory devices in the integrated circuit device, and wherein each of the plurality of memory devices has its own corresponding memory isolation logic.

12. The integrated circuit device of claim 5, wherein the integrated circuit device includes a plurality of memory devices of different types, and a plurality of memory isolation logic corresponding to the respective different types of memory devices.

13. The integrated circuit device of claim 5, wherein the memory isolation logic is implemented using a state machine having an idle state, a busy state, an isolated state, and a wait state, and wherein the state machine transitions from the idle state to the busy state in response to assertion of an isolation signal, and transitions from the isolated state to the wait state in response to deassertion of the isolation signal.

14. The integrated circuit device of claim 5, wherein the memory isolation logic is communicatively coupled between the memory interface and the user programmable logic using an Advanced extensible Interface (AXI) protocol.

15. A method performed by memory isolation logic of an integrated circuit device, the method comprising:
  receiving an isolation request to retain data in a memory device during a reconfiguration of user programmable logic, the memory isolation logic communicatively coupled between the user programmable logic and a memory interface that is configured to perform read and write accesses with the memory device;
  determining that the memory device is ready to be isolated;
  isolating the memory device to retain the data stored in the memory device by invalidating memory requests from the user programmable logic during the reconfiguration of the user programmable logic;
  receiving a de-isolation request when the reconfiguration of the user programmable logic is completed; and
  providing the user programmable logic with access to the data retained in the memory device after receiving the de-isolation request, the data being reused by the user programmable logic across multiple reconfigurations of the user programmable logic.

16. The method of claim 15, wherein determining that the memory device is ready to be isolated includes determining that all pending transactions to the memory device have been completed.

17. The method of claim 15, wherein determining that the memory device is ready to be isolated is based upon expiration of a timer that is initiated when the isolation request is received.

18. The method of claim 15, further comprising, prior to providing the user programmable logic with the access to the memory device:
  waiting for a pre-determined number of cycles following the de-isolation request.

19. The method of claim 15, wherein isolating the memory device includes driving outputs from the memory isolation logic to the memory device to a known stable state.

20. The method of claim 15, wherein the integrated circuit device is a field programmable gate array (FPGA) device, and the reconfiguration of the user programmable logic includes downloading a bitstream to the FPGA device that reconfigures the user programmable logic without reprogramming the memory interface, and the memory isolation logic.

21. The integrated circuit device of claim 5, wherein the data being retained in the memory device during the reconfiguration of the user programmable logic includes calibration data for interfacing the memory device with a memory controller.

* * * * *